United States Patent Office 3,209,019
Patented Sept. 28, 1965

3,209,019
THIONOPHOSPHONIC ACID ESTERS AND PROCESS FOR THEIR PRODUCTION
Gerhard Schrader, Wuppertal-Cronenberg, and Reimer Cölln, Wuppertal-Elberfeld, Germany, assignors to Farbenfabriken Bayer Aktiengesellschaft, Leverkusen, Germany, a corporation of Germany
No Drawing. Filed Oct. 4, 1960, Ser. No. 60,288
Claims priority, application Germany, Oct. 9, 1959, F 29,570
15 Claims. (Cl. 260—461)

The present invention relates to and has as its objects new and useful insecticidal thiophosphonic acid esters and processes for their production. The new compounds of the present invention may be represented by the following general formula

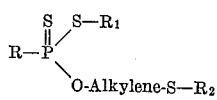

wherein R stands for an optional aliphatic, araliphatic, aromatic or cycloaliphatic radical, $R_1$ is to be an alkyl radical, $R_2$ is to stand for an aliphatic or aromatic radical and Alkylene may be a possibly substituted lower alkylene chain. It has, so far, not been possible to produce the said compounds, since the necessary starting materials, the thionophosphonic acid thiol ester halides of the following formula

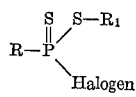

such as the methyl-thionothiol-phosphonic acid ethyl ester chloride of the following formula

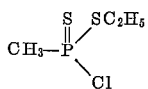

were unknown as yet.

In accordance with the present invention it has now been found that these esters can be obtained in a simple manner by first reacting the easily obtainable dithiophosphonic acid anhydrides with thio ether alkanols and subsequently further alkylating the compounds obtained in a manner known in principle.

This involves the following reactions:

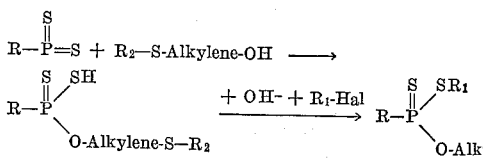

The symbols in these formulae have the same significance as given above.

The aforesaid process is broadly applicable to a great variety of compounds and yields the new thionophosphone-O.S-dialkyl esters in average in good yields and great purity. The reaction is preferably carried out in an inert solvent at room temperature to slightly elevated temperature. Inert solvents are chiefly lower ketones, aromatic hydrocarbons such as benzene, toluene and the like.

More specifically the above mentioned starting materials, namely the dithiophosphonic acid anhydrides, which are suitable according to the present invention are lower alkyl- or aryl-dithiophosphonic acid anhydrides such as methyl-dithiophosphonic acid anhydride, ethyl-dithiophosphonic acid anhydride, the propyl-dithiophosphonic acid anhydrides, the various butyl-dithiophosphonic acid anhydrides, phenyl-dithiophosphonic acid anhydride and the like. The alcohols $OH$-Alkylene-$SR_2$ more specifically to be used according to the present invention may be methyl-mercapto methanol, ethyl-mercapto methanol, phenyl-mercapto methanol, p - chlorophenyl - mercapto methanol, methyl-mercapto ethanol, ethyl-mercapto ethanol, other substituted mercapto ethanols, as said before, corresponding substituted mercapto-propanols, and isopropanols, and the like. Still other alcohols $R_2S$-Alkylene-$OH$ are such alcohols in which the Alkylene group is further substituted by other alkylmercapto groups, dialkyl-amino groups, carboxylic acid ester groups and the like. The last reaction components, the alkylating agents $R_1$-Hal may be methyl-iodide, ethyl-iodide, propyl-iodide; instead of compounds $R_1$-Hal also other alkylating agents may be used which do not contain a halogen atom, but the corresponding derivatives of sulfuric acid, toluene sulfonic acids and the like. Examples for these alkylating agents may be dimethyl sulfate, ethyl-p-toluene sulfonate, and other compounds of this type.

The new compounds of the present invention very effectively kill insects such as flies, mites, aphids, etc. They distinguish themselves especially by a good contact-insecticidal action and at the same time by an activity on eating insects such as caterpillars. The compounds may be used in the same manner as other known phosphoric acid insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the ester of the following formula

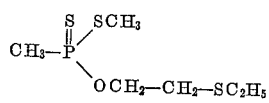

has been tested against aphids and spider mites. Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

(a) Against aphids (species *Doralis fabae*): Heavily infested bean plants (*Vitia faba*) have been sprayed drip-wet with solutions as prepared above in a concentration as shown below. The effect has been determined after 24 hours by counting the dead pests either on the surface of the soil or still remaining on the plants. The following result has been obtained: Complete killing with 0.01% solutions.

(b) Against spider mites (contact insecticidal action): Bean plants (*Phaseolus vulgaris*) of about 15 inches height were sprayed drip wet with solutions as prepared above in a concentration as shown below. The bean plants have been infested heavily with the two-spotted spider (species *Tetranychus telarius*). Evaluation has been carried out after 24 hours, 48 hours and 8 days. The following result has been obtained: Complete killing with 0.001% solutions.

The following examples are given for the purpose of illustrating the present invention.

*Example 1*

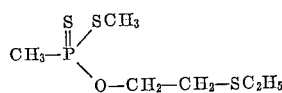

55 grams (0.5 mol) of methyl-dithiophosphonic acid anhydride are suspended in 200 ml. of benzene. 55 grams of β-hydroxyethyl-thioethyl ether are added while stirring and the reaction product is kept at 50° C. for an hour. The dithiophosphonic acid anhydride has then dissolved. Subsequently, a solution of 30 grams of caustic potash in 150 ml. of methanol is added at 30° C. 71 grams of methyl iodide are then added dropwise with good stirring at 40° C. The reaction product is kept at 40–50° C. for another hour and then poured into 300 ml. of ice-water. The precipitated oil is diluted with 200 ml. of benzene and washed with water until neutral. After drying the benzenic solution, the material is fractionated. In this way, 64 grams of the new ester of B.P. 82° C./0.01 mm. Hg are obtained. Yield 56% of the theoretical. The ester is a colorless water-insoluble oil.

Calculated for mol 230: S, 41.7%; P, 13.5%. Found: S, 42.1%; P, 12.5%.

Toxicity on rats per os $LD_{50}$ 5 mg./kg.: Aphids are killed completely with 0.01% solutions and spider mites are killed completely with 0.001% solutions.

*Example 2*

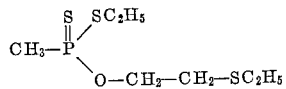

55 grams (0.5 mol) of methyl-dithiophosphonic acid anhydride are suspended in 200 ml. of benzene. Subsequently, 55 grams of β-hydroxyethyl-thioethyl ether are added at 40° C. while stirring. The mixture is kept at 60° C. for a further hour and the resulting acid is then neutralized by the addition of a solution of 30 grams of caustic potash in 150 ml. of methanol. At 50° C. there are added with good stirring 78 grams of ethyl-iodide. The reaction product is kept at 50° C. for another hour and working up is carried out as described in Example 1. In this way 56 grams of the new ester of B.P. 88° C./0.01 mm. Hg are obtained. Yield: 46% of the theoretical.

Calculated for mol 244: S, 39.3%; P, 12.6%. Found: S, 39.6%; P, 12.2%.

Toxicity on rats per os $LD_{50}$ 10 mg./kg.: Aphids and spider mites are killed completely with 0.01% solutions. The compound has an ovicidal activity against the eggs of the red spider.

*Example 3*

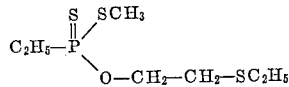

62 grams (0.5 mol) of ethyl-dithiophosphonic acid anhydride are suspended in 200 ml. of benzene. 55 grams of β-hydroxyethyl-thioethyl ether are then added dropwise at 50° C. while stirring. The mixture is kept at 50° C. for an hour and a solution of 30 grams of caustic potash in 150 ml. of methanol is then added at 20° C. while stirring. Subsequently, 71 grams of methyl iodide are added at 45° C. while stirring is continued. The reaction product is kept at 50° C. for an hour and worked up as described in Example 1. 104 grams of the new ester of B.P. 87° C./0.01 mm. Hg are thus obtained. Yield: 85% of the theoretical.

Toxicity on rats per os $LD_{50}$ 10 mg./kg.: Flies are killed completely with 0.001% solutions. Systemic action with 0.1% solutions=100%.

Under similar conditions the following compounds are obtained:

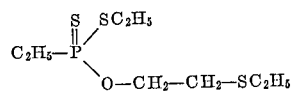

B.P. 93° C./0.01 mm. Hg. Yield: 75% of the theoretical.

Toxicity on rats per os 10 mg./kg.: Aphids and caterpillars are killed completely with 0.1% solutions;

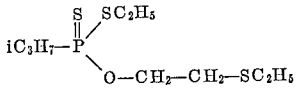

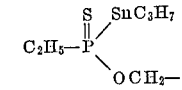

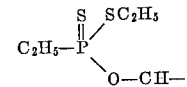

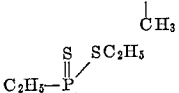

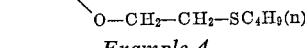

*Example 4*

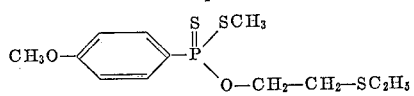

102 grams (0.5 mol) of p-methoxy-phenyl-dithiophosphonic acid anhydride are suspended in 200 ml. of benzene. 55 grams of β-hydroxyethyl-thioethyl ether are added at 70° C. while stirring. The mixture is heated at 70° C. for another hour and a solution of 30 grams of caustic potash in 150 ml. of methanol is then added at 30° C. Subsequently, 71 grams of methyl iodide are added at 45° C. while stirring is continued. The reaction product is heated at 50° C. for another hour. The reaction product is then poured into 300 ml. of ice-water and the precipitated oil taken up with 200 ml. of benzene. The benzenic layer is washed neutral and dried. The benzene is then removed under vacuum. In this way, 127 grams of the new ester are obtained as a yellow water-insoluble oil.

Calculated for mol 322: S, 29.8%; P, 9.6%. Found: S, 28.6%; P, 9.5%.

Toxicity on rats per os $LD_{50}$ 100 mg./kg.: Spider mites are killed completely with 0.01% solutions. Caterpillars are killed completely with 0.1% solutions.

By the same way there may be obtained the compounds of the following formulae:

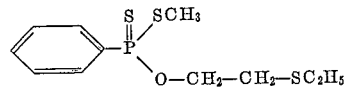

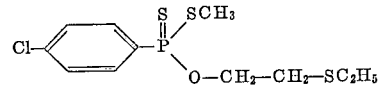

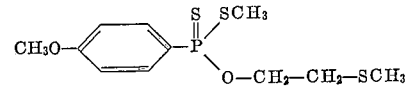

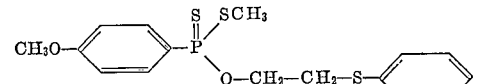

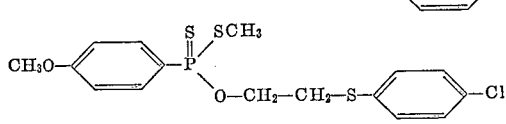

Example 5

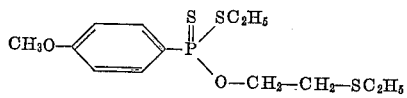

102 grams (0.5 mol) of p-methoxy-phenyl-dithiophosphonic acid anhydride are suspended in 200 ml. of benzene. 55 grams of β-hydroxyethyl-thioethyl ether are then added while stirring. The mixture is kept at 80° C. for an hour and a solution of 30 grams of caustic potash in 150 ml. of methanol is then added at 30° C. while stirring. Subsequently, 78 grams of ethyl iodide are added dropwise to the reaction product at 50° C. The product is kept at 50–60° C. for a further hour and then worked up as described in the preceding example. In this way, 111 grams of the new ester are obtained as a pale yellow water-insoluble oil. Yield: 66% of the theoretical.

Calculated for mol 336: S, 28.6%; P, 9.3%. Found: S, 29.0%; P, 9.5%.

Toxicity on rats per os $LD_{50}$ to 100 mg./kg.: Spider mites are killed completely with 0.1% solutions. The compound shows an ovicidal activity against the eggs of red spiders.

Example 6

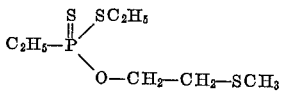

62 grams (0.5 mol) of ethyl-dithiophosphonic acid anhydride are suspended in 200 ml. of benzene. 46 grams of β-methylmercapto ethyl alcohol are added thereto at 45° C. The mixture is heated to 65° C. for an hour. The ethyl-dithiophosphonic acid anhydride has then dissolved. Subsequently, 30 grams of caustic potash dissolved in 150 ml. of methanol are added at 20° C. 78 grams of ethyl iodide are then added to the reaction product while stirring is continued. The mixture is heated to 60° C. for a further hour and then worked up in usual manner. 79 grams of the new ester of B.P. 770 C./0.01 mm. Hg are thus obtained. Yield: 65% of the theoretical.

Calculated for mol 244: S, 39.4%; P, 12.7%. Found: S, 39.7%; P, 12.9%.

Toxicity on rats per os $LD_{50}$ 10 mg./kg.: Flies are killed completely with 0.001% solutions. Aphids are killed to 100% with 0.1% solutions.

Example 7

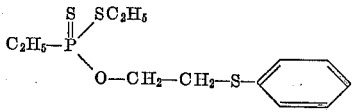

62 grams (0.5 mol) of ethyl-dithiophosphonic acid anhydride are suspended in 200 ml. of benzene. 77 grams of β-phenylmercapto ethyl alcohol are added at 40° C. while stirring. The mixture is heated to 60° C. for an hour. The ethyl-dithiophosphonic acid anhydride has then dissolved. Subsequently, a solution of 30 grams of caustic potash in 150 ml. of methanol is added with stirring. 78 grams of ethyl iodide are then added dropwise while stirring is continued. The product is kept at 60–70° C. for a further hour and then worked up in usual manner. 115 grams of the new ester are thus obtained as a pale yellow water-insoluble oil. Yield: 75% of the theoretical.

Calculated for mol 306: S, 31.4%; P, 10.1%. Found: S, 31.4%; P, 9.9%.

Toxicity on rats per os $LD_{50}$ 25 mg./kg.: Aphids are killed completely with 0.1% solutions. Systemic action with 0.1% solution=100%.

By the same way there may be obtained the compounds of the following formulae:

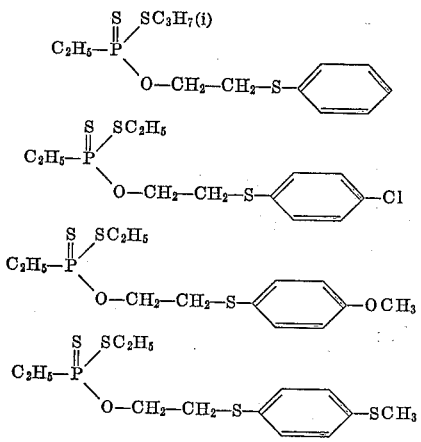

Example 8

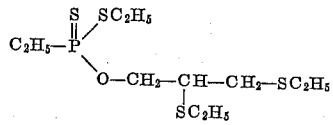

62 grams (0.5 mol) of ethyl-dithiophosphonic acid anhydride are suspended in 200 ml. of benzene. 90 grams of 2.3-bis-ethylmercapto propanol (B.P. 126° C./10 mm. Hg) are added at 40° C. while stirring. The mixture is heated to 60° C. for a further hour and a solution of 30 grams of caustic potash in 150 ml. of methanol is then added. Subsequently, 78 grams of ethyl iodide are added at 60° C. while stirring is continued. The product is kept at 60° C. for a further hour and then worked up in usual manner. 130 grams of the new ester are thus obtained as a pale yellow water-insoluble oil.

Calculated for mol 332: S, 38.6%; P, 9.3%. Found: S, 38.7%; P, 9.1%.

Toxicity on rats per os $LD_{50}$ 250 mg./kg.: Aphids are killed completely with 0.1% solutions. Systemic action with 0.1% solution=100%.

By the same way there may be obtained the compound of the following formula:

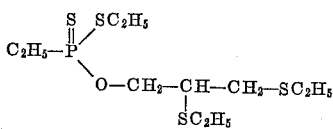

Example 9

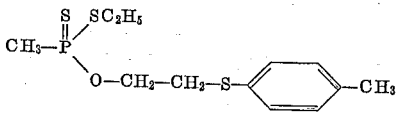

55 grams (0.5 mol) of methyl-dithiophosphonic acid anhydride are suspended in 200 ml. of benzene. 84 grams of β-(4-methylphenyl)-thio-ethylalcohol are added at 40° C. while stirring. The mixture is stirred at 60° C. for another hour and a solution of 30 grams of caustic potash in 150 ml. of methanol is then added dropwise at 20° C. Subsequently, 78 grams of ethyl iodide are added at 60° C. The product is stirred at 70° C. for another hour and then worked up in usual manner. 117 grams of the new ester are thus obtained as a yellow water-insoluble oil. Yield: 77% of the theoretical.

Toxicity on rats per os $LD_{50}$ 100 mg./kg.: Aphids are killed completely with 0.1% solutions.

By the same way there may be obtained the compounds of the following formulae:

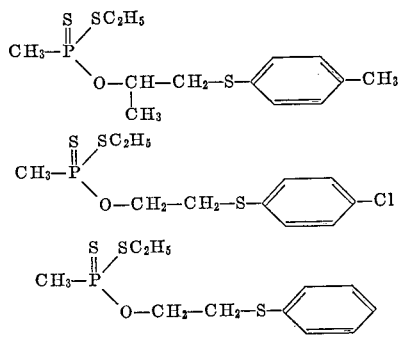

We claim:
1. A compound of the formula

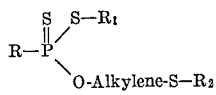

wherein R stands for a member selected from the group consisting of lower alkyl having up to 4 carbon atoms, phenyl, chlorophenyl and lower alkoxy phenyl, $R_1$ stands for lower alkyl having up to 4 carbon atoms, $R_2$ stands for a member selected from the group consisting of lower alkyl having up to 4 carbon atoms, phenyl, lower alkyl-substituted phenyl, chlorophenyl, lower alkyl mercapto phenyl and lower alkoxy phenyl and Alkylene stands for a member selected from the group consisting of lower alkylene having up to 4 carbon atoms and lower alkylene having up to 4 carbon atoms and bearing an additional

group.

2. A compound of claim 1 wherein R, $R_1$ and $R_2$ are each lower alkyl having up to 4 carbon atoms and Alkylene is lower alkylene having up to 4 carbon atoms.

3. A compound of claim 1 wherein R is lower alkoxy phenyl, $R_1$ and $R_2$ are lower alkyl having up to 4 carbon atoms and Alkylene is lower alkylene.

4. A compound of claim 1 wherein R and $R_1$ are each lower alkyl, $R_2$ is phenyl and Alkylene is lower alkylene having up to 4 carbon atoms.

5. A compound of claim 1 wherein R, $R_1$ and $R_2$ are each lower alkyl having up to 4 carbon atoms and Alkylene is lower alkylene having up to 4 carbon atoms and bearing an additional —S—$R_2$ group wherein $R_2$ is lower alkyl having up to 4 carbon atoms.

6. A compound of claim 1 wherein R and $R_1$ are each lower alkyl having up to 4 carbon atoms, $R_2$ is lower alkyl phenyl and Alkylene is lower alkylene having up to 4 carbon atoms.

7. The compound of the following formula:

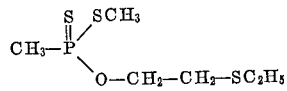

8. The compound of the following formula:

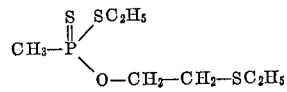

9. The compound of the following formula:

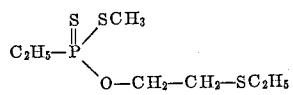

10. The compound of the following formula:

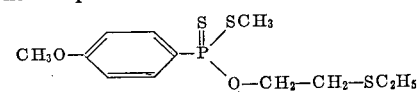

11. The compound of the following formula:

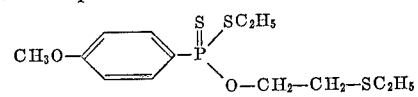

12. The compound of the following formula:

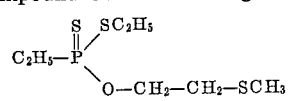

13. The compound of the following formula:

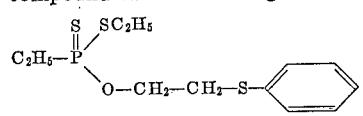

14. The compound of the following formula:

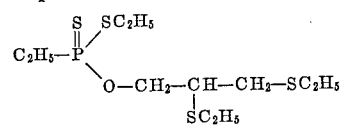

15. The compound of the following formula:

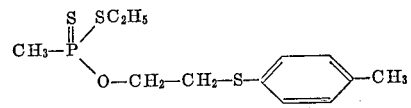

References Cited by the Examiner

UNITED STATES PATENTS

| | | | |
|---|---|---|---|
| 2,881,201 | 4/59 | Schrader | 260—461 |
| 2,907,787 | 10/59 | Hoffmann et al. | 260—461 |
| 2,961,458 | 11/60 | Schegk et al. | 260—461 |
| 2,963,505 | 12/60 | Muhlmann et al. | 260—461 |
| 2,983,748 | 5/61 | Schlor et al. | 260—461 |

FOREIGN PATENTS

| | | |
|---|---|---|
| 1,032,247 | 6/58 | Germany. |
| 1,057,112 | 5/59 | Germany. |

OTHER REFERENCES

Aaron: "Jour. Amer. Chem. Soc.," volume 80, January 20, 1958, pages 456–458.

Metcalf et al.: "Jour. Econ. Entomol.," volume 53, pages 127–130 (February 1960).

Razumov et al.: "Chem. Abst.," volume 52, column 294(g) (1958).

CHARLES B. PARKER, *Primary Examiner.*

ABRAHAM H. WINKELSTEIN, MORRIS LIEBMAN, JOSEPH P. BRUST, *Examiners.*